(No Model.)

F. HOLDEN.
DAMPING DEVICE FOR ELECTRICAL MEASURING INSTRUMENTS.

No. 518,245. Patented Apr. 17, 1894.

WITNESSES—
Alec F. Macdonald.
N. L. Hayes.

INVENTOR—
Frank Holden
by Bentley & Blodgett
Attys.

THE NATIONAL LITHOGRAPHING COMPANY,
WASHINGTON, D. C.

UNITED STATES PATENT OFFICE.

FRANK HOLDEN, OF LYNN, ASSIGNOR TO THE GENERAL ELECTRIC COMPANY, OF BOSTON, MASSACHUSETTS.

DAMPING DEVICE FOR ELECTRICAL MEASURING-INSTRUMENTS.

SPECIFICATION forming part of Letters Patent No. 518,245, dated April 17, 1894.

Application filed March 3, 1893. Serial No. 464,538. (No model.)

*To all whom it may concern:*

Be it known that I, FRANK HOLDEN, a citizen of the United States, and a resident of Lynn, county of Essex, and State of Massachusetts, have made certain new and useful Improvements in Damping Devices for Electrical Measuring-Instruments, of which the following is a specification.

My invention relates to means of preventing a continued oscillation or vibration of the vane or needle of an electrical measuring instrument of any kind. This continued oscillation or vibration renders it difficult to read the indications of the scale correctly.

The accompanying drawings hereby referred to and made part of this specification show an embodiment of my invention, like letters referring to like parts in all the figures.

Figure 1:
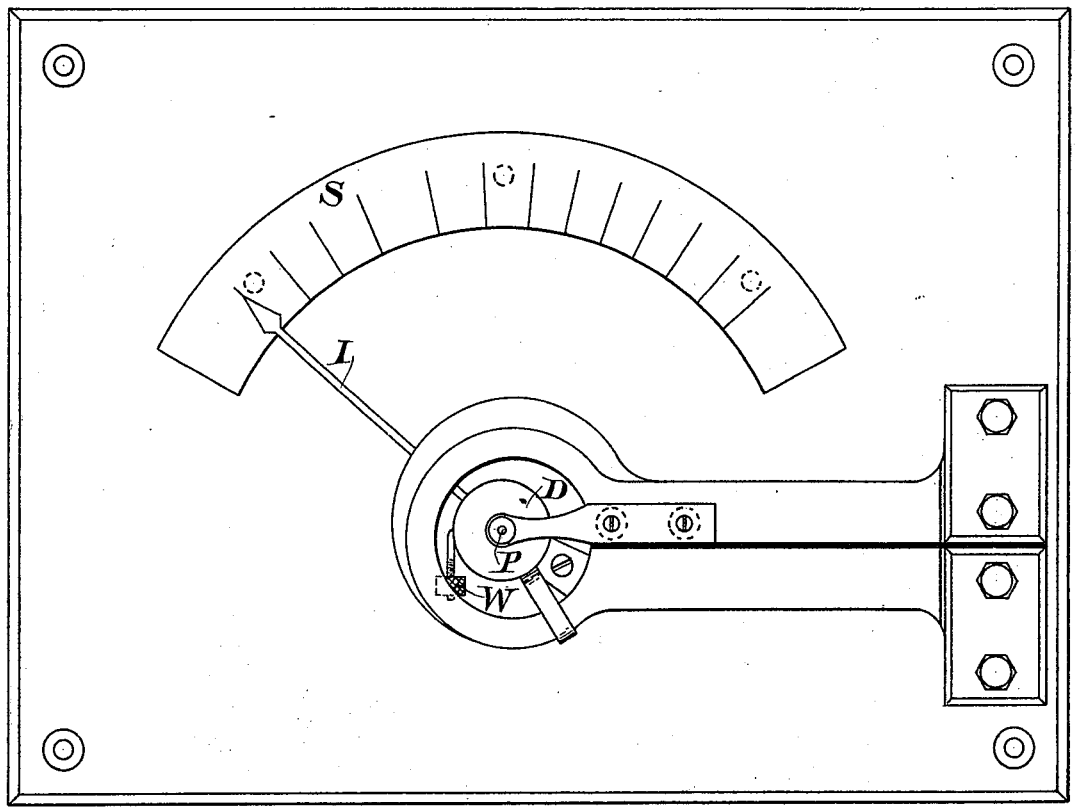
Figure 2:
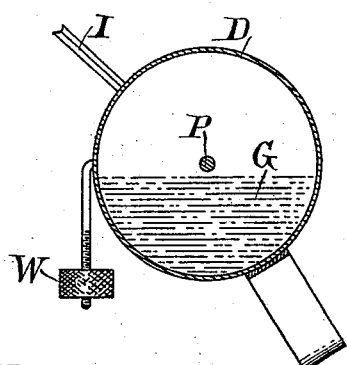

Figure 1 is a front elevation of an electric meter having my improved damping device attached thereto. Fig. 2 is a section showing the damping device detached.

D is a drum of thin metal inclosing a quantity of a viscous liquid such as glycerine, which I have found suited for the purpose of my invention, but for which any other liquid of suitable consistency may be substituted, the liquid being indicated by the letter G.

W is a weight attached as shown to a screw-threaded stem, by which it may be raised or lowered, thus adjusting the center of gravity and correcting the needle-reading to the zero of the scale. The drum D is hermetically sealed and rotates upon centrally-located pivots one of which is shown in section in Fig. 2 and the other in plan in Fig. 1, all being marked with the letter P. To the drum a suitable index I, reciprocating over the scale S, is attached.

The operation of my device is as follows: When the current passes through the meter, causing the index I to move over the scale, the drum rotates upon its pivots and this rotation is opposed by the resistance or inertia of the glycerine or other viscous liquid, in whichever direction the drum tends to move. The liquid thus acts as a sort of dash-pot, checking, but not stopping, the rotation of the drum. An increase of the effect may be obtained by increasing the diameter of the drum, as shown in Fig. 2, or its length may be increased, thus increasing the amount of the contained liquid and its consequent resistance.

I have found my device as thus constructed an efficient and economical one, having advantages in economy over the ordinary permanent magnet and closed conductor arrangement often used.

I am aware that it is old to force vanes through a liquid held in a stationary vessel for the purpose of retarding the motion of an indicating apparatus; but in my invention the liquid is closed in a hermetically sealed chamber, to which there is no access for dirt, and from which evaporation or leakage is impossible, and the liquid acts purely by its own inertia.

What I claim, and wish to protect by Letters Patent of the United States, is—

1. A damping device for measuring instruments consisting of a hermetically sealed chamber having a plain inner surface and inclosing a viscous liquid.

2. A damping device for a measuring instrument, consisting of a hermetically sealed chamber centrally mounted upon pivots and inclosing a viscous liquid such sealed chamber having a plain inner surface.

3. In combination with an electric measuring instrument, a damping device consisting of a hermetically sealed drum, as D, rotated about pivots attached to its center, as P P, and inclosing a quantity of a viscous liquid, as G; the drum provided with an adjustable weight as W, whereby the center of gravity may be adjusted, as and for the purposes herein set forth.

In witness whereof I hereunto set my hand this 1st day of March, 1893.

FRANK HOLDEN.

Witnesses:
   JOHN W. GIBBONEY,
   JOHN T. BRODERICK.